US008036385B2

(12) United States Patent
Funnell (10) Patent No.: US 8,036,385 B2
(45) Date of Patent: Oct. 11, 2011

(54) APPARATUS AND METHOD FOR APPLYING CIPHERING IN A UNIVERSAL MOBILE TELECOMMUNICATIONS SYSTEM

(75) Inventor: Nicola Funnell, Warwickshire (GB)

(73) Assignee: Research In Motion Limited, Waterloo (CA)

( * ) Notice: Subject to any disclaimer, the term of this patent is extended or adjusted under 35 U.S.C. 154(b) by 961 days.

(21) Appl. No.: 10/864,292

(22) Filed: Jun. 9, 2004

(65) Prior Publication Data

US 2005/0276417 A1    Dec. 15, 2005

(51) Int. Cl.
*H04K 1/00* (2006.01)
(52) U.S. Cl. ........ 380/270; 380/252; 380/272; 380/273; 380/278; 455/446
(58) Field of Classification Search .................. 380/272, 380/270, 252, 278, 273; 455/446
See application file for complete search history.

(56) References Cited

U.S. PATENT DOCUMENTS

| 5,148,485 | A  | * | 9/1992  | Dent ................................ 380/46 |
| 6,031,637 | A  | * | 2/2000  | Shibata et al. ................ 358/468 |
| 6,909,887 | B2 | * | 6/2005  | Fauconnier et al. .......... 455/403 |
| 7,020,455 | B2 | * | 3/2006  | Krishnarajah et al. ........ 455/410 |
| 7,076,060 | B1 | * | 7/2006  | Bilchev ............................ 380/37 |
| 7,158,805 | B1 | * | 1/2007  | Park et al. ...................... 455/519 |
| 2002/0071480 | A1 | * | 6/2002 | Marjelund et al. ............ 375/141 |
| 2002/0147021 | A1 | * | 10/2002 | June ............................... 455/452 |
| 2003/0035545 | A1 | * | 2/2003 | Jiang ............................. 380/272 |
| 2003/0076859 | A1 | * | 4/2003 | Jiang ............................. 370/509 |
| 2003/0100291 | A1 | * | 5/2003 | Krishnarajah et al. ........ 455/410 |
| 2004/0096062 | A1 | * | 5/2004 | Oh ................................. 380/270 |
| 2004/0131180 | A1 | * | 7/2004 | Mazuz et al. .................. 380/37 |
| 2004/0228491 | A1 | * | 11/2004 | Wu ................................ 380/272 |
| 2005/0203929 | A1 | * | 9/2005 | Hazarika et al. .............. 707/100 |

FOREIGN PATENT DOCUMENTS

| EP | 1 248 487 | 10/2002 |
| WO | WO 00/76194 | 12/2000 |
| WO | WO 02/15600 | 2/2002 |

OTHER PUBLICATIONS

Tanner, Rudolf and Woodard, Jason. "WCDMA-Requirments and Practical Design". John Wiley & Sons, Ltd: Mar. 2004. http://www3.interscience.wiley.com/cgi-bin/bookhome/109871589.*

* cited by examiner

*Primary Examiner* — Edan Orgad
*Assistant Examiner* — Kari Schmidt (57) ABSTRACT

Apparatus and a method for ciphering messages in mobile telecommunications system user equipment and network are disclosed. The apparatus is arranged to store a plurality of current ciphering configurations and/or a plurality of old (previously applied) ciphering configurations and/or a plurality of new (future) ciphering configurations. Thus different ciphering configuration may be applied at different times and for different radio bearers.

21 Claims, 5 Drawing Sheets

Fig. 5

APPARATUS AND METHOD FOR APPLYING CIPHERING IN A UNIVERSAL MOBILE TELECOMMUNICATIONS SYSTEM

BACKGROUND

1. Technical Field

This application relates to mobile telecommunications systems in general, having particular application in UMTS (Universal Mobile Telecommunications System) in general, and in particular to an apparatus and method for applying ciphering in universal mobile telecommunications system user equipment and network.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

The radio access network covers a geographical area divided into a plurality of cell areas. Each cell area is served by at least one base station, which may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

In UMTS each radio bearer (including signalling radio bearers) may be configured to apply ciphering to all data as part of the security features of UMTS. Both the UE and the UTRAN store ciphering configurations for applying ciphering. The 25.331 standard states in section 8.6.3.4 that, at any given time, the UE needs to store at most two different ciphering configurations (keyset and algorithm) per Core Network (CN) domain at any given time in total for all radio bearers and three configurations in total for all signalling radio bearers.

The ciphering configurations which are stored are: the current ciphering configuration (the configuration which is currently being applied to the data sent or received on the radio bearer); a new ciphering configuration (if one exists); and an old configuration.

As far as a new ciphering configuration is concerned, if the UTRAN has decided to change the ciphering configuration, there is a period of time after the new configuration has been sent to the UE and before the new configuration is used. This period of time allows the UTRAN and UE radio bearers to synchronise a move to the new configuration at the same time and so no loss of data is encountered. The time at which the new configuration becomes current may be different for each radio bearer as it depends on traffic flow in that radio bearer.

The old configuration is also stored because Packet Data Units (PDUs) which have failed to be received correctly may be retransmitted by the UTRAN and are ciphered using the configuration which was current at the time they were first sent. It is therefore possible that some PDUs which were originally sent before the new ciphering configuration was activated are resent with the previously used (old) ciphering configuration.

Parties may submit proposals to 3GPP and the agenda item TSGR2#((99)K58 submitted to the TSG-RAN working group 2 of the 3GPP (which may be found at <http://www.3gpp.org/ftp/tsg_yan/WG2_RL2/TSGR2_09/Docs/Zips/R2-99k58.doc>) relates to the activation time for new ciphering configurations in Unacknowledged Mode (UM) and Acknowledged Mode (AM).

There are proposed strategies for dealing with ciphering configurations. A number of such strategies are detailed below.

Other aspects and features of the present invention will become apparent to those ordinarily skilled in the art upon review of the following description of specific embodiments of an apparatus and method for applying ciphering in mobile telecommunications system user equipment.

BRIEF DESCRIPTION OF THE DRAWINGS

Embodiments of the present invention will now be described, by way of example only, with reference to the attached drawings, in which.

The same reference numerals are used in different figures to denote similar elements.

DETAILED DESCRIPTION OF THE DRAWINGS

An apparatus and method for applying ciphering in universal mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for applying ciphering in a mobile telecommunications system, the system comprising a network of a plurality of cells and at least one user equipment device, in which parameters relating to a plurality of ciphering configurations for a given type of ciphering configuration are stored. Thus, for instance, a plurality of new ciphering configurations, old ciphering configurations or current ciphering configurations may be stored.

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

Figure 1:
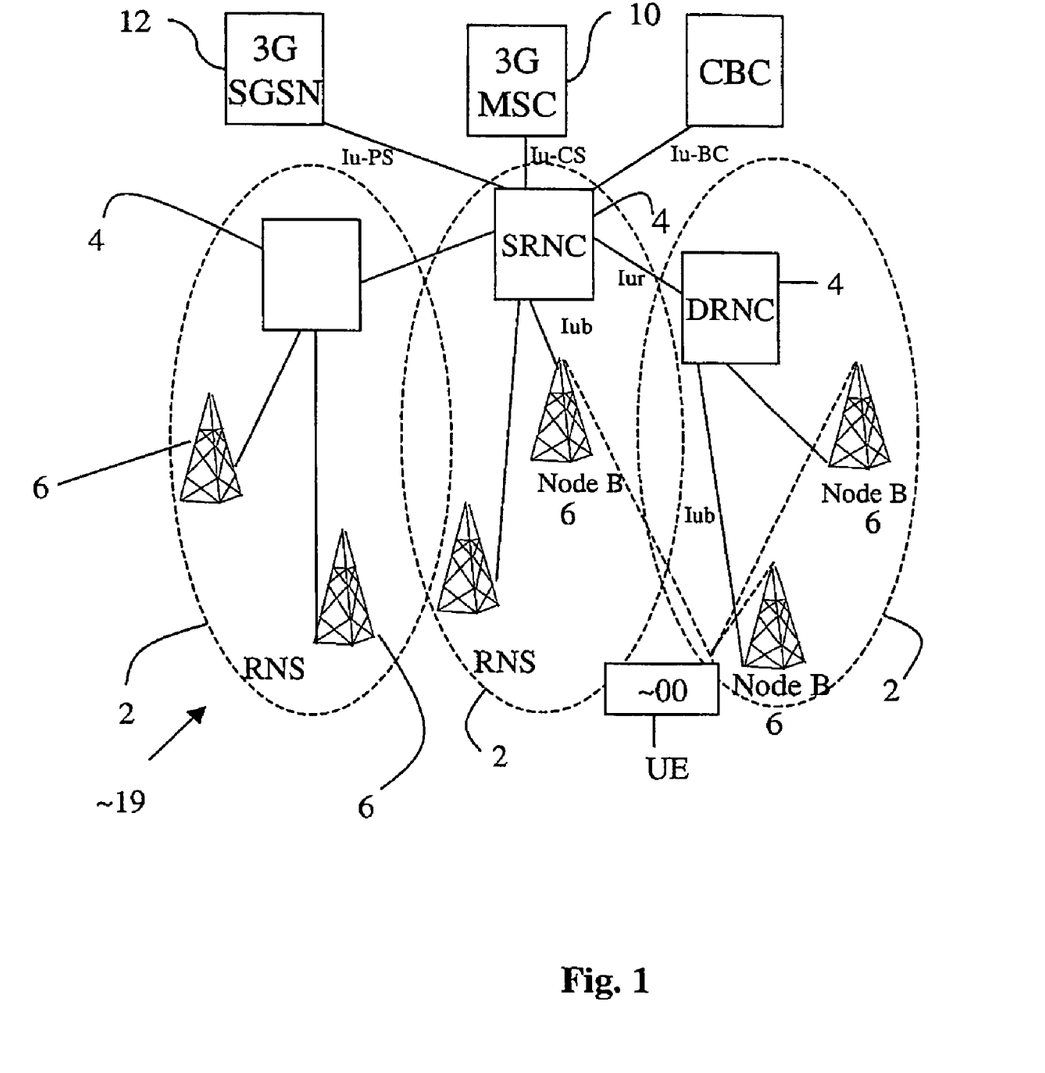
FIG. 1 is an overview of a mobile telecommunications system.

Referring to the drawings, FIG. 1 shows an overview of a network and a UE device. Clearly in practice there may be many UE devices operating with the network but, for the sake of simplicity, FIG. 1 only shows a single UE device 500. For the purposes of illustration, FIG. 1 also shows a network 519 having a few components. It will be clear to a person skilled in the art that in practice a network will include far more components than those shown.

FIG. 1 shows an overview of the radio access network 519 (UTRAN) used in a UMTS system. The network 519 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 500 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also be connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

The UE 500 is configured to store more than one ciphering configuration of a given type (current, old, new) such that a plurality of current ciphering configurations are stored and/or a plurality of old (previously applied) ciphering configurations are stored and/or a plurality of new (future) ciphering configurations are stored.

The UTRAN 519 may also be configured to store more than one ciphering configuration of a given type (current, old, new) for each Radio Bearer such that a plurality of current ciphering configurations are stored and/or a plurality of old (previously applied) ciphering configurations are stored and/or a plurality of new (future) ciphering configurations are stored.

For instance, a plurality of old ciphering configurations may be stored. If the transmit window for a radio bearer is large then it is possible that the ciphering configuration may be changed more than once between the first transmission of a PDU and its retransmission.

Additionally or alternatively a plurality of pending new configurations may be stored. For instance, according to clause 8.1.12.4b of the 25.331 standard, if a cell update procedure is initiated during the change in security configuration, then the configuration should be aborted and the UE should resume to the state it was in before it attempted the change. Storing a plurality of pending new configurations enables a UE to also revert to using a pending new configuration which was the pending new configuration at the time the change was attempted.

Therefore if the UE had previously been storing a pending configuration, and a new configuration was received, the UE stores both pending future configurations until the configuration is complete so that it may restore the original pending configuration if the change is aborted. The UTRAN may also store both pending future configurations until the configuration is complete.

The size of the transmission window is different for each radio bearer. This means that the number of old configurations which are required may be different for each radio bearer. Also each radio bearer will not necessarily have the same old or current ciphering configurations as other radio bearers. Since the activation time for each radio bearer is dependant on traffic flow, the new configuration may become the current configuration at different times on different radio bearers. So at any given time some radio bearers may be using the newest ciphering configuration, while others may be using the previous one as the new has not activated yet. Thus the UE and/or network may store more than one current configuration so that the RBs may have a different current configuration depending on the activation time for each RB.

The configurations may activate at different times in different Radio Bearers. Allowing the storage of a plurality of configurations for a given type of ciphering configuration means that it is possible to store new, old and current configurations for each Radio Bearer, each of which may be different from each other. Thus configurations relevant for each Radio Bearer may be stored, rather than only storing three configurations per CN domain.

In this way it is easier for the UE and network to determine which ciphering configuration should be used for each PDU to be transmitted or retransmitted on a Radio Bearer. If the UE or network was limited to storing only one new, one current and one old configuration for all Radio Bearers, the UE or network may simply not have the required configuration and so it would be unable to cipher or decipher the data.

The UE or UTRAN may be arranged to store ciphering configurations in the layer of the protocol stack that applies the ciphering. Thus, for instance, the UE may store ciphering configurations in the Radio Resource Control (RRC), a sublayer of Layer 3 on the UMTS radio interface. Alternatively the UE may store the ciphering configurations in the Radio Link Control (RLC) layer, a sublayer of the radio interface. This latter implementation has the advantage in Unacknowledged Mode (UM) and Acknowledged Mode (AM), as in these modes it is the RLC layer that applies the ciphering to the data and thus less signalling will be required to determine the ciphering configuration to be applied. In Transparent Mode (TM), the UE may be arranged to store the ciphering configurations in the MAC layer as in TM the ciphering is applied in the MAC layer. The UTRAN also includes a similar protocol stack with the RLC and the MAC generally being stored in a RNC.

An example will now be considered of the operation of a UE which stores parameters relating to more than one instance of a ciphering configuration of a given type. Consider two radio bearers RB1 and RB2. At time t=0, each radio bearer has the same old, current and new configurations (C1, C2 and C3 respectively) with C2 activating at time t=0, but C3 activates at time t2 in RB1 and t4 in RB2. So at time t=0 the UE is configured as follows:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |

At time t=1 the UE is configured as follows:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |
| 1      | C1  | C2      | $C3_{t2}$ | C1 | C2 | $C3_{t4}$ |

At time t=2:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |
| 1      | C1  | C2      | $C3_{t2}$ | C1 | C2 | $C3_{t4}$ |
| 2      | $C1_{<t0}$/ $C2_{\geq t0, <t2}$ | C3 | — | C1 | C2 | $C3_{t4}$ |

At time t=2, RB1 has two Old ciphering configurations C1 and C2. C1 will be applied to any PDUs that are subsequently received but which were transmitted prior to t=0 and C2 will be applied to any PDUs that are subsequently received but which were transmitted on or after t=0 and before t=2. C3 is applied to PDUs with a sequence number representing time after t=2. RB2 has a single old, new and current configuration.

At time t=4 the new cipher configuration $C_3$ will activate for RB2 and the following cipher configurations are stored:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |
| 1      | C1  | C2      | $C3_{t2}$ | C1 | C2 | $C3_{t4}$ |
| 2      | $C1_{<t0}$/ $C2_{\geq t0, <t2}$ | C3 | — | C1 | C2 | $C3_{t4}$ |
| 3      | $C1_{<t0}$/ $C2_{\geq t0, <t2}$ | C3 | — | C1 | C2 | $C3_{t4}$ |
| 4      | $C1_{<t0}$/ $C2_{\geq t0, <t2}$ | C3 | — | $C1_{<t0}$/ $C2_{\geq t0, <t4}$ | C3 | — |

Old ciphering configurations may be discarded as soon as all PDUs transmitted with that ciphering configuration have been received by the UE. Thus in the above example, the old ciphering configuration C1 may be deleted for RB1 once all PDUs transmitted prior to t=0 have been received. This may be determined by examining the sequence number of each PDU.

Now consider the situation in which at time t=3 the UTRAN changes the new ciphering configuration to C4 with activation times in each RB as follows:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |
| 1      | C1  | C2      | $C3_{t2}$ | C1 | C2 | $C3_{t4}$ |
| 2      | $C1_{<t0}$/ $C2_{\geq t0, <t2}$ | C3 | — | C1 | C2 | $C3_{t4}$ |
| 3      | $C1_{<t0}$/ $C2_{\geq t0, <t2}$ | C3 | $C4_{t5}$ | C1 | C2 | $C4_{t4}$ |

According to the 25.331 standard, if a UTRAN sends a new configuration (e.g. C4) before a previous one has activated (e.g. C3), then the UTRAN must use the same activation time. So therefore, as shown above, the new configuration C4 has an activation time t4, the same as the previous new configuration C3. C3 may therefore be deleted from the configurations for RB2 as being redundant.

Now after t4 and t5 have passed the stored cipher configurations are as follows:

|        | RB1 | | | RB2 | | |
|--------|-----|---------|-----|-----|---------|-----|
| Time t | Old | Current | New | Old | Current | New |
| 0      | C1  | C2      | $C3_{t2}$ | C1 | C2 | $C3_{t4}$ |
| 1      | C1  | C2      | $C3_{t2}$ | C1 | C2 | $C3_{t4}$ |
| 2      | $C1_{<t0}$/ $C2_{\geq t0, <t2}$ | C3 | — | C1 | C2 | $C3_{t4}$ |
| 3      | $C1_{<t0}$/ $C2_{\geq t0, <t2}$ | C3 | $C4_{t5}$ | C1 | C2 | $C4_{t4}$ |
| 4      | $C1_{<t0}$/ $C2_{\geq t0, <t2}$ | C3 | $C4_{t5}$ | $C1_{<t0}$/ $C2_{\geq t0, <t4}$ | C4 | — |
| 5      | $C1_{<t0}$/ $C2_{\geq t0, <t2}$/ $C3_{\geq t2, t5}$ | C4 | — | $C1_{<t0}$/ $C2_{\geq t0, <t4}$ | C4 | — |

If a PDU which was originally transmitted just after t2 is retransmitted after t5, C3 will be used if the PDU was transmitted on RB1 and C2 if the PDU was transmitted on RB2. As shown above, at t=3 there are two new configurations shown with the same activation time. The two new ciphering configurations C3 and C4 only exist whilst the configurations procedure occurs. If the ciphering configuration C4 is successfully implemented, then C3 is discarded. If the configuration procedure implementing ciphering configuration C4 fails, then C4 may be discarded and C3 implemented as the new ciphering configuration.

The situation may be similar when implemented in the network.

Messages from between the UTRAN and the UE include a sequence number that is sequential. The time indications given above may be considered equivalent to the sequence number included in messages sent by the UTRAN to the UE. As the sequence numbers are sequential, the UE may determine whether a PDU has been missed by virtue of this sequence number. When a UE determines from the sequence number that all messages ciphered with a given cipher configuration Cn have been received, then the UE may discard the old ciphering configuration Cn as it is no longer applicable.

Figure 2:
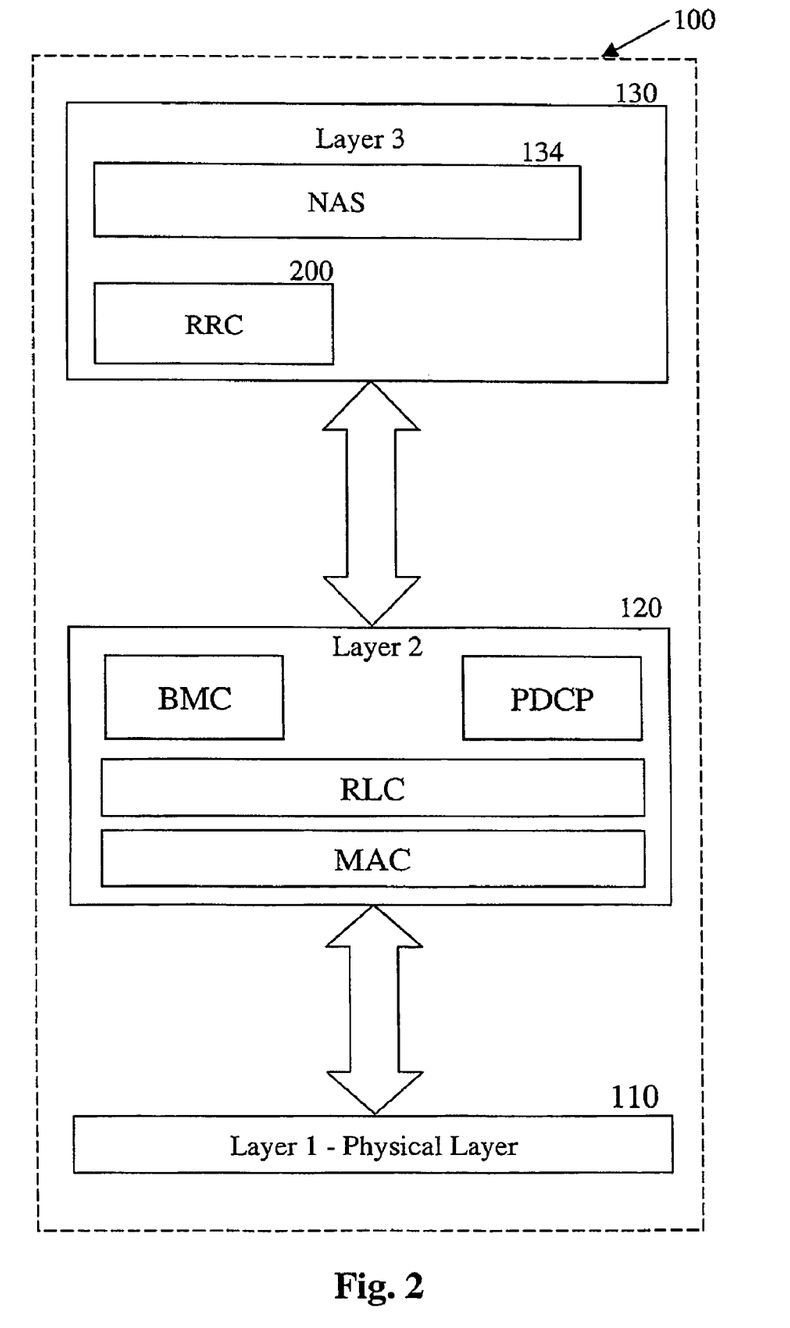
FIG. 2 is a block diagram illustrating an embodiment of a protocol stack, apparatus provided with a cell update handling RRC block, in accordance with the present application.

Referring to the drawings, FIG. 2 is a block diagram illustrating an embodiment of a device's protocol stack provided with a RRC block, in accordance with the present application.

The RRC block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. When the UTRAN wishes to change the UE configuration it will issue a message to the UE containing a command to invoke a specific RRC procedure. The RRC 200 layer of the UE decodes this message and initiates the appropriate RRC procedure. When the procedure has been completed (either successfully or not) then the RRC may send a response message to the UTRAN (via the lower layers) informing the UTRAN of the outcome. However, in many cases the RRC need not and does not reply.

The RRC block 200 can implement several different behaviour strategies for implementing ciphering of messages. The number of ciphering configurations of a given type (current, new, old) may be limitless or a maximum limit (e.g. 20) may be applied. The UE may be arranged to delete any old ciphering configurations that are no longer applicable for any radio bearer in use by the UE on a CN domain.

The operation of a UE having the capability to store ciphering parameters relating to a plurality of ciphering configurations of a given type (e.g. current, new, old) will now be described with reference to the drawings.

Figure 3:
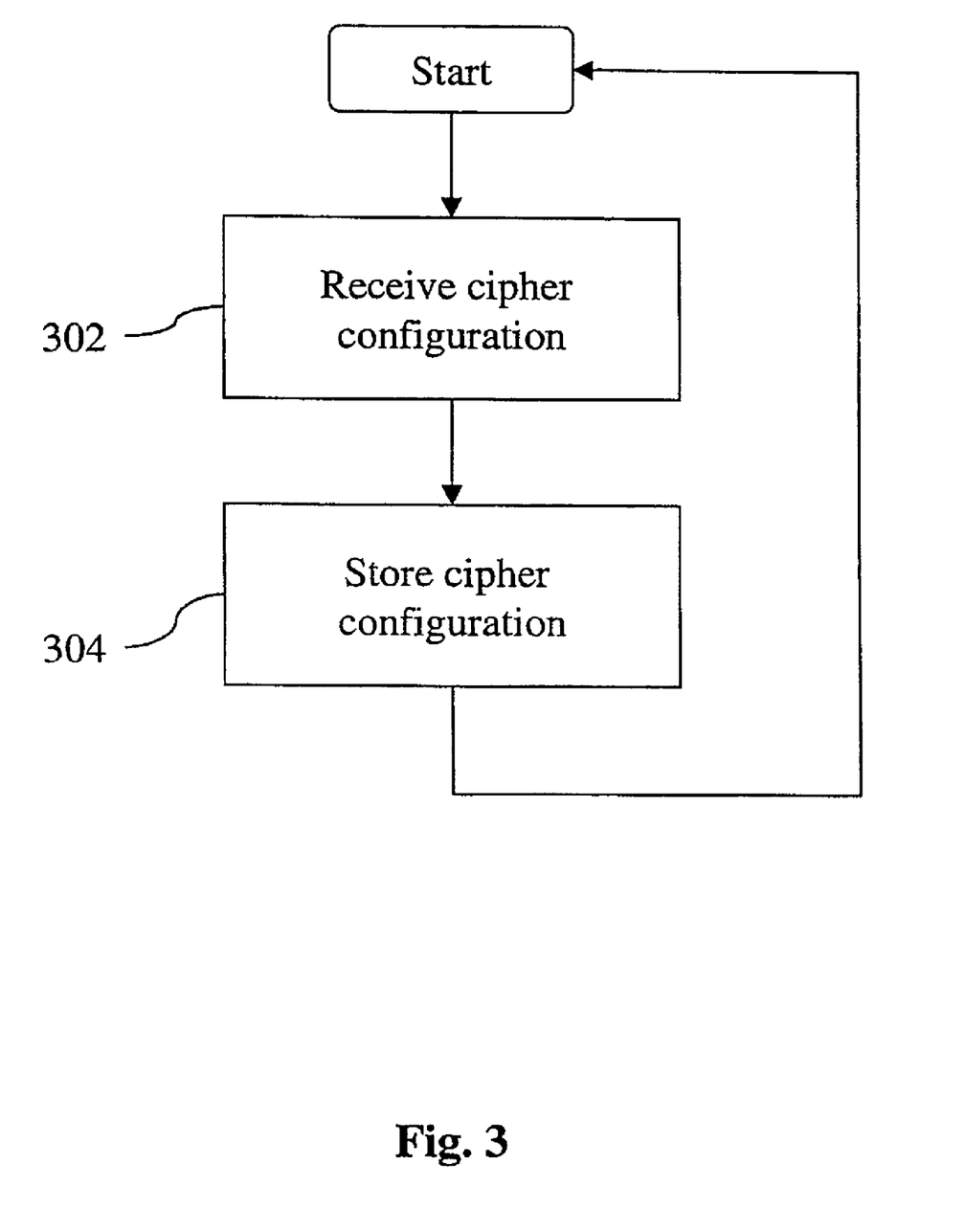
FIG. 3 is a flow diagram illustrating storage of cipher configurations in user equipment.

FIG. 3 is a flow chart illustrating the operation of a UE according to one embodiment of handling of cipher configurations by the UE. At step 302, the UE receives cipher configuration parameters (for instance according to clause 8.1.12.3 of the 25.331 standard these parameters are contained in the field "Ciphering mode Info"). At step 304, the ciphering configuration information is stored in a memory of the UE.

Figure 4:
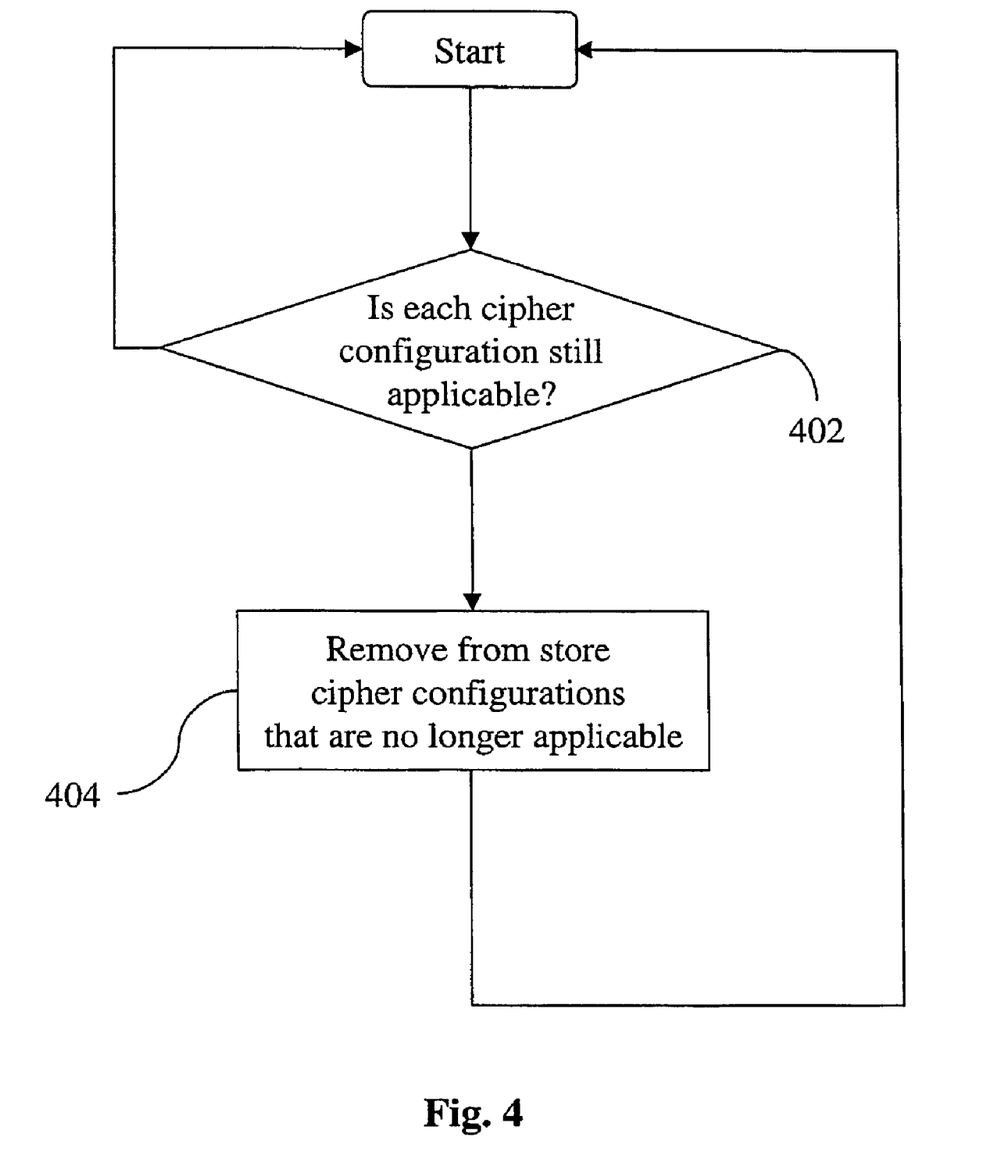
FIG. 4 is a flow diagram illustrating management of cipher configurations in user equipment.

Periodically, the UE carries out an audit of the stored cipher configurations. As illustrated in FIG. 4, at step 402 the UE determines whether each of the stored cipher configurations is still applicable. As mentioned above, this determination may be based on the sequence numbers of messages sent and received by the UE. The UE then, at step 404, removes from the store any ciphering configurations that are deemed no longer to be applicable.

Thus the UE may store all the ciphering configurations that it receives for a given Core Network, but manages the storage so that ciphering configurations are deleted when it is determined that they are no longer applicable to messages sent and received by the UE.

When this technique is implemented in the network, the operation of the network may be similar. Thus a network device in the UTRAN (for instance, the RNC) maintains a protocol stack for a given device similar to that shown in FIG. 2 and the UTRAN has the capability to store ciphering parameters relating to a plurality of ciphering configurations of a given type (e.g. current, new, old). The UTRAN stores different configurations for different RB's, domains and UEs. For each RB for each UE the UTRAN may store a plurality of different ciphering configurations of a given type.

Figure 5:
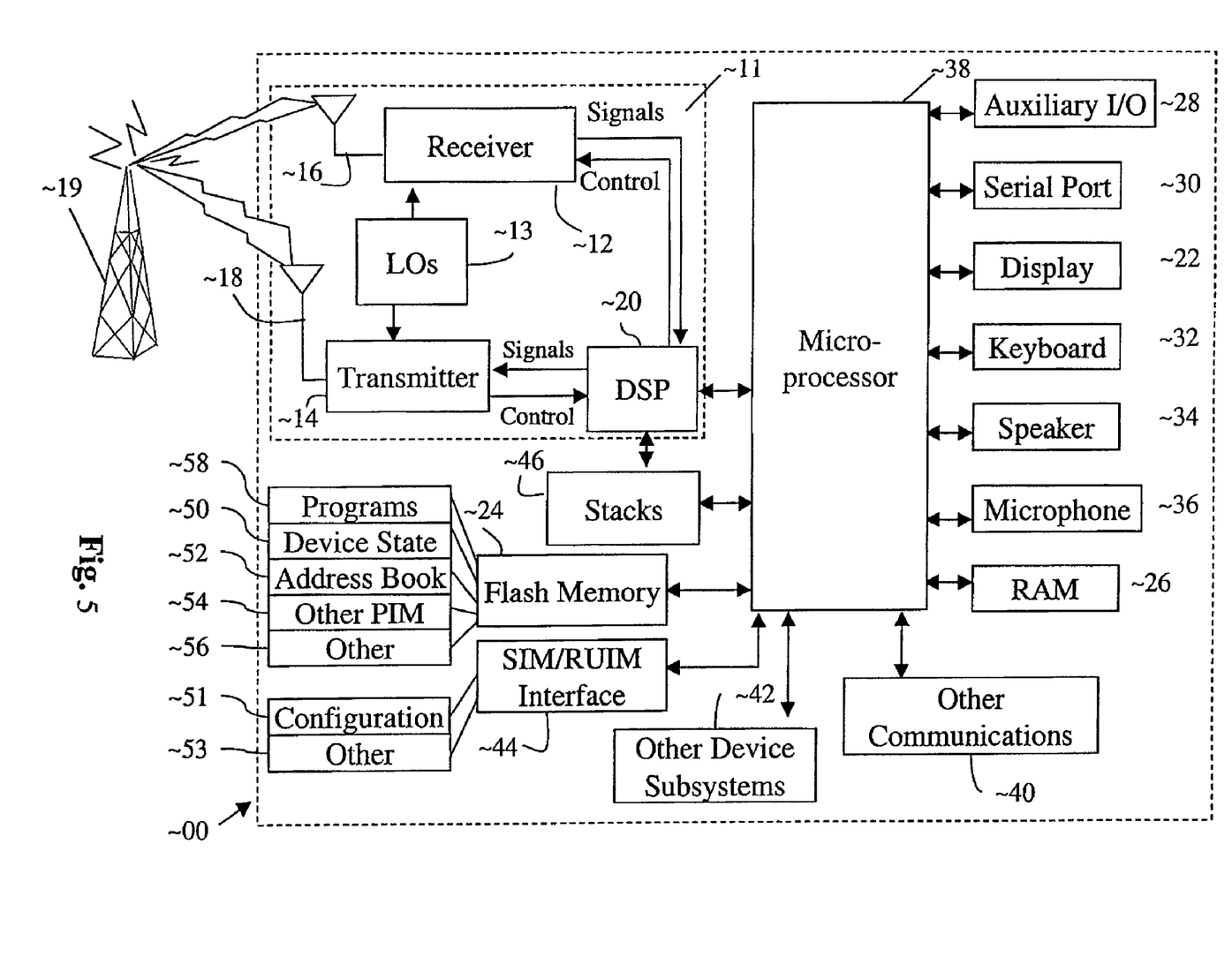
FIG. 5 is a block diagram illustrating a mobile device, which can act as a UE and co-operate with the apparatus and methods of FIGS. 1 to 4.

Turning now to FIG. 5, FIG. 5 is a block diagram illustrating a mobile device, which can act as a UE and co-operate with the apparatus and methods of FIGS. 1 to 9, and which is an exemplary wireless communication device. Mobile station 500 is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate. For example, mobile station 500 may include a communication subsystem 511 designed to operate within the Mobitex™ mobile communication system, the DataTAC™ mobile communication system, GPRS network, UMTS network, or EDGE network.

Network access requirements will also vary depending upon the type of network 502. For example, in the Mobitex and DataTAC networks, mobile station 500 is registered on the network using a unique identification number associated with each mobile station. In UMTS and GPRS networks, however, network access is associated with a subscriber or user of mobile station 500. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 500 will be unable to carry out any other functions involving communications over the network 502. The SIM interface 544 is normally similar to a card-slot into which a SIM card can be inserted and ejected like a diskette or PCMCIA card. The SIM card can have approximately 64K of memory and hold many key configuration 551, and other information 553 such as identification, and subscriber related information.

When required network registration or activation procedures have been completed, mobile station 500 may send and receive communication signals over the network 502. Signals received by antenna 516 through communication network 502 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 502 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 preferably includes a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 502. In a preferred embodiment, the PIM data items are seamlessly integrated, synchronized and updated, via the wireless network 502, with the mobile station user's corresponding data items stored or associated with a host computer system. Further applications may also be loaded onto the mobile station 500 through the network 502, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5, would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is used as a UE, protocol stacks 546 include apparatus and a method for handling messages that relate to a cell other than the currently operating cell in universal mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of the evaluation is immaterial with respect to the operation of the method. The ordering of the steps as described herein is not intended to be limiting.

It is also to be noted that where a method has been described it is also intended that protection is also sought for a device arranged to carry out the method and where features have been claimed independently of each other these may be used together with other claimed features.

What is claimed is:

1. A method for applying ciphering in a user equipment device (UE) configurable for operation in a mobile telecommunications system comprising a network of a plurality of cells, the method comprising:
   receiving a wireless communication over a radio bearer (RB);
   selecting, from a plurality of ciphering configurations stored in the UE and based on the RB, a subset of the plurality of ciphering configurations that may be used on the wireless communication;
   determining, based on the RB and the wireless communication, which type of ciphering configuration to use on the wireless communication;
   using one ciphering configuration from the selected subset and of the determined type on the RB; and
   where the UE is configurable to periodically audit stored ciphering configurations by which to determine whether stored ciphering configurations are applicable based on sequence numbers of messages sent and received and to delete stored ciphering configurations deemed no longer applicable based on the audit and sequence numbers of messages sent and received over the RB in question.

2. The method according to claim 1 wherein the types of ciphering configuration comprise at least one of the group comprising: new ciphering configuration, old ciphering configuration and ciphering configuration.

3. The method according to claim 1, wherein a maximum limit is applied to the number of ciphering configuration of a given type that are stored.

4. The method according to claim 1 further comprising determining whether parameters of a ciphering configuration are required, and removing parameters that are determined to be no longer required.

5. The method according to claim 1 wherein the UE is capable of communicating via a plurality of radio bearers, the method further comprising storing parameters relating to a plurality of ciphering configurations for a given type of ciphering configuration for each radio bearer.

6. The method according to claim 1 further comprising storing parameters in a layer of a protocol stack which layer applies the ciphering.

7. A mobile telecommunications device configured for use in a mobile telecommunications system, the device comprising:
   a receiver enabled to receive wireless communications over a plurality of radio bearers (RBs); and
   a microprocessor, memory, and software operable to select, from a plurality of stored ciphering configurations, one stored ciphering configuration for use on an RB, and operable to periodically audit stored ciphering configurations by determining whether stored ciphering configurations are applicable based on sequence numbers of messages sent and received and to delete any ciphering configuration deemed no longer applicable based on the audit sequence numbers of messages sent and received over the RB in question.

8. The device according to claim 7, stored ciphering configurations including at least one of the group comprising: new ciphering configuration, old ciphering configuration and ciphering configuration.

9. The device according to claim 7, wherein a maximum limit is applied to the number configurations of a given type that are stored.

10. The device according to claim 7 further arranged to determine whether parameters of a ciphering configuration are required, and to delete parameters that are determined to be no longer required.

11. The device according to claim 7 further arranged to apply the appropriate ciphering configuration according to parameters stored with each ciphering configuration.

12. The device according to claim 7 wherein the device is further arranged to store parameters associated with the ciphering configurations in a layer of a protocol stack which applies ciphering.

13. The device according to claim 12 wherein the device is operable in a Universal Mobile Telecommunications System and the parameters are stored in at last one of the Radio Link Control Layer and the Medium Access Control (MAC) layer of the protocol stack of the device.

14. A mobile telecommunications network comprising a network of a plurality of cells from a plurality of Node B transceivers and at least one radio network controller (RNC), comprising:
   a microprocessor, memory, and software operable to select, from a plurality of stored ciphering configurations, the stored ciphering configurations including a plurality of types of ciphering configurations, one cipher configuration to use on one radio bearer (RB), and operable to periodically audit stored ciphering configurations by determining whether stored ciphering configurations are applicable based on the audit and sequence numbers of messages sent and received over the RB in question and to delete any ciphering configuration deemed no longer applicable.

15. The network according to claim 14, the types of ciphering configuration being at least one of the group comprising: new ciphering configuration, old ciphering configuration and ciphering configuration.

16. The network according to claim 14, wherein a maximum limit is applied to the number of ciphering configurations of a given type that are stored.

17. The network according to claim 14 further arranged to determine whether parameters of a ciphering configuration are required, and to delete parameters that are determined to be no longer required.

18. The network according to claim 14 further arranged to apply the appropriate ciphering configuration according to parameters stored with each ciphering configuration.

19. The network according to claim 14 wherein the device is further arranged to store parameters associated with the ciphering configurations in a layer of a protocol stack which applies ciphering.

20. The network according to claim 19 wherein the network is operable in a Universal Mobile Telecommunications System and the parameters are stored in at-least one of the Radio Link Control Layer and the Medium Access Control (MAC) layer of the protocol stack.

21. The network according to claim 14 wherein the microprocessor, memory, and software reside on the RNC.

* * * * *